（12) United States Patent
Grussmann et al.

(10) Patent No.: US 7,198,459 B2
(45) Date of Patent: Apr. 3, 2007

(54) CASING ARRANGEMENT FOR A TURBOCHARGER OF AN INTERNAL COMBUSTION ENGINE

(75) Inventors: Elmar Grussmann, Altenbeken (DE); Christian Smatloch, Paderborn (DE); Axel Hinder, Borchen (DE); Thomas Körner, Recklinghausen (DE); Rainer Müller, Grünstadt (DE)

(73) Assignees: Benteler Automobiltechnik GmbH, Paderborn (DE); BorgWarner Inc., Auburn Hills, MI (US)

( * ) Notice: Subject to any disclaimer, the term of this patent is extended or adjusted under 35 U.S.C. 154(b) by 195 days.

(21) Appl. No.: 10/987,945

(22) Filed: Nov. 12, 2004

(65) Prior Publication Data

US 2005/0133012 A1 Jun. 23, 2005

(30) Foreign Application Priority Data

Nov. 13, 2003 (DE) ................. 103 52 960

(51) Int. Cl.
*F01D 25/26* (2006.01)
(52) U.S. Cl. ...................... 415/135; 415/134
(58) Field of Classification Search ............. 415/134, 415/135, 126, 241.1; 60/602, 417, 4; 417/405–407
See application file for complete search history.

(56) References Cited

U.S. PATENT DOCUMENTS

| 3,042,291 | A | * | 7/1962 | Greenwald ............... 415/26 |
| 3,078,071 | A | * | 2/1963 | Henny et al. ............. 415/135 |
| 3,490,794 | A | * | 1/1970 | Swanson ................ 285/148.11 |
| 3,761,205 | A | * | 9/1973 | Cronstedt ................ 417/407 |
| 3,965,681 | A | * | 6/1976 | Wyczalek et al. .......... 60/599 |
| 4,955,641 | A | * | 9/1990 | Dent .................... 285/96 |
| 2006/0133931 | A1 | * | 6/2006 | Burmester et al. ........ 415/204 |

FOREIGN PATENT DOCUMENTS

DE 100 22 052 C2 3/2001

* cited by examiner

*Primary Examiner*—Edward K. Look
*Assistant Examiner*—Nathan Wiehe
(74) *Attorney, Agent, or Firm*—Henry M. Feiereisen

(57) ABSTRACT

A casing assembly for a turbocharger of an internal combustion engine includes a rotor casing having an intake duct and an exhaust flow passage which is connected to an exhaust flange and constructed for attachment to the rotor casing such as to allow a relative movement between the exhaust flow passage and the rotor casing. In this way, a sliding fit is provided which prevents thermal stress in the system rotor casing and exhaust flow passage. An outer housing surrounds the exhaust flow passage, rotor casing and intake duct.

3 Claims, 2 Drawing Sheets

CASING ARRANGEMENT FOR A TURBOCHARGER OF AN INTERNAL COMBUSTION ENGINE

CROSS-REFERENCES TO RELATED APPLICATIONS

This application claims the priority of German Patent Application, Serial No. 103 52 960.8, filed Nov. 13, 2003, pursuant to 35 U.S.C. 119(a)–(d), the disclosure of which is incorporated herein by reference.

BACKGROUND OF THE INVENTION

The present invention relates, in general, to a casing arrangement for a turbocharger of an internal combustion engine.

Nothing in the following discussion of the state of the art is to be construed as an admission of prior art.

German Pat. No. DE 100 22 052 C2 discloses a turbine casing having an inlet funnel, a rotor casing, which is surrounded by an outer housing and made two-part configuration, and an exhaust pipe. The rotor casing is welded to one end of the exhaust pipe. The other end of the exhaust pipe is welded to the outer housing in an area of a connection flange. Welding of the exhaust pipe with the rotor casing as well as with the connection flange results in significant thermal stress of the internal system comprised of the rotor casing and the exhaust pipe. This thermal stress is compounded by the provision of an insulating air gap between the rotor casing and the outer housing to shield the outer housing from the rotor casing and the flow passage. While a direct contact of the outer housing with exhaust is hereby avoided, the downside is, however, that the outer housing is significantly cooler. When high operating temperatures are involved, this thermal stress causes premature material fatigue and thus premature breakdown of the rotor casing and/or exhaust pipe. In addition, deformation caused by heat may result in a contact between the rotor casing and the rotor, leading to a sudden breakdown of the turbocharger.

It would therefore be desirable and advantageous to provide an improved casing arrangement for a turbocharger of an internal combustion engine to obviate prior art shortcomings and to minimize a passage of exhaust about the rotor.

SUMMARY OF THE INVENTION

According to one aspect of the present invention, a casing arrangement for a turbocharger of an internal combustion engine includes a rotor casing having an intake duct, an exhaust flow passage connected to an exhaust flange and constructed for attachment to the rotor casing such as to allow a relative movement between the exhaust flow passage and the rotor casing, and an outer housing in surrounding relationship to the exhaust flow passage, rotor casing and intake duct.

The present invention resolves prior art problems by separating the function of the outer housing from the function of the rotor casing. The outer housing, which can be constructed to suit the application at hand, and may be comprised of several parts and made of steel sheet or at least partly of precision casting, assumes hereby the function of sealing and support whereas the rotor casing, which may also be made of several parts, assumes the function of exhaust guide. As a consequence, the rotor casing quickly heats up and is able to assist a rapid heating of the catalytic converter. Suitably, the rotor casing should have a wall thickness which is constructed as thin as possible.

When starting a motor in cold state, the rotor casing quickly heats up and expands accordingly, while the outer housing remains cold and is subjected to almost no thermal expansion. As a consequence of the self-adjusting sliding coupling between the exhaust flow passage and the rotor casing, heat-based movement of the rotor casing are compensated so that no damaging stress can occur, even when temperatures are high. A contact between rotor casing and rotor can thus be positively prevented.

The present invention is also advantageous in a situation when a motor vehicle travels uphill and negotiates a mountain route. Also in this case, the rotor quickly heats up. When the vehicle then travels downhill, in particular using the engine brake, the rotor casing cools down fairly quickly, as cold air (in the absence of combustion, so-called overrun fuel cutoff) is guided through the engine to the rotor casing. As a consequence, the rotor casing quickly contracts while the outer housing still remains warm. Also in this travel situation, the sliding coupling between the rotor casing and the exhaust flow passage prevents inadmissible stress. The service life becomes thus greatly increased.

A casing arrangement according to the present invention results in extended service life because thermal stress is reduced during heat-up and cool-down phases. The overall efficiency is also enhanced through optimizing the operating behavior as a function of the operating temperature. Manufacturing costs are reduced through material diversification or use of less expensive materials. The use of a casing arrangement according to the invention becomes also possible in double-flow casings as well as in turbochargers with so-called adjustable turbine geometry.

The exhaust flow passage can be constructed in any desired manner. It may be a particular component or integrated in one piece in the exhaust flange, e.g., when using precision casting in particular for manufacturing the exhaust flange.

According to another feature of the present invention, the rotor casing may include an axial tubular outlet member, wherein the exhaust flow passage may be configured with a cylindrical end portion which so overlaps the outlet member as to allow a relative movement therebetween and thereby form a sliding fit. Despite narrow configuration, there is no need to design the sliding fit gastight because the outer housing assumes the sealing function against the surrounding environment. The abutment of the cylindrical end portion of the exhaust flow passage upon the outer periphery of the outlet member of the rotor casing may be enhanced when the end portion of the exhaust flow passage has a radially inwardly embossed annular bead. The convex surface of the annular bead is thus in friction contact with the surface of the outlet member of the rotor casing.

According to another feature of the present invention, the end portion of the exhaust flow passage may have a radially outwardly embossed annular bead to thereby define an inner annular groove for receiving a sealing element. As a result, the sealing effect of the overall system is improved while maintaining a very good sliding function and enhancing the service life. The sealing element may be a sealing ring which rests against the outer surface of the outlet member of the rotor casing.

According to another feature of the present invention, the rotor casing may include an axial tubular outlet member which is snugly coupled with a cylindrical end portion of the exhaust flow passage through the intervention of a bellows. In this way, the length compensation between the rotor casing and the exhaust flange can be further improved. The exhaust flow passage may be a separate component, for example in the form of a tube made of sheet metal. Of course, it is also possible to directly connect the exhaust flow passage to the exhaust flange. The linkage between the exhaust flow passage with the rotor casing via the bellows results in a reliable sealing function because the bellows is snugly fitted to the outlet member of the rotor casing as well as to the exhaust flow passage.

According to another feature of the present invention, the bellows has opposite tubular ends which respectively overlap the outlet member of the rotor casing and the neighboring end portion of the exhaust flow passage, and is snugly joined, especially welded, via these ends with the outlet member and the flow passage. Suitably, the ends of the bellows are secured to the outlet member of the rotor casing and the exhaust flow passage by clips. By means of the clips, the ends of the bellows are drawn against the outer surfaces of the outlet member and the flow passage to securely fix the bellows in place.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
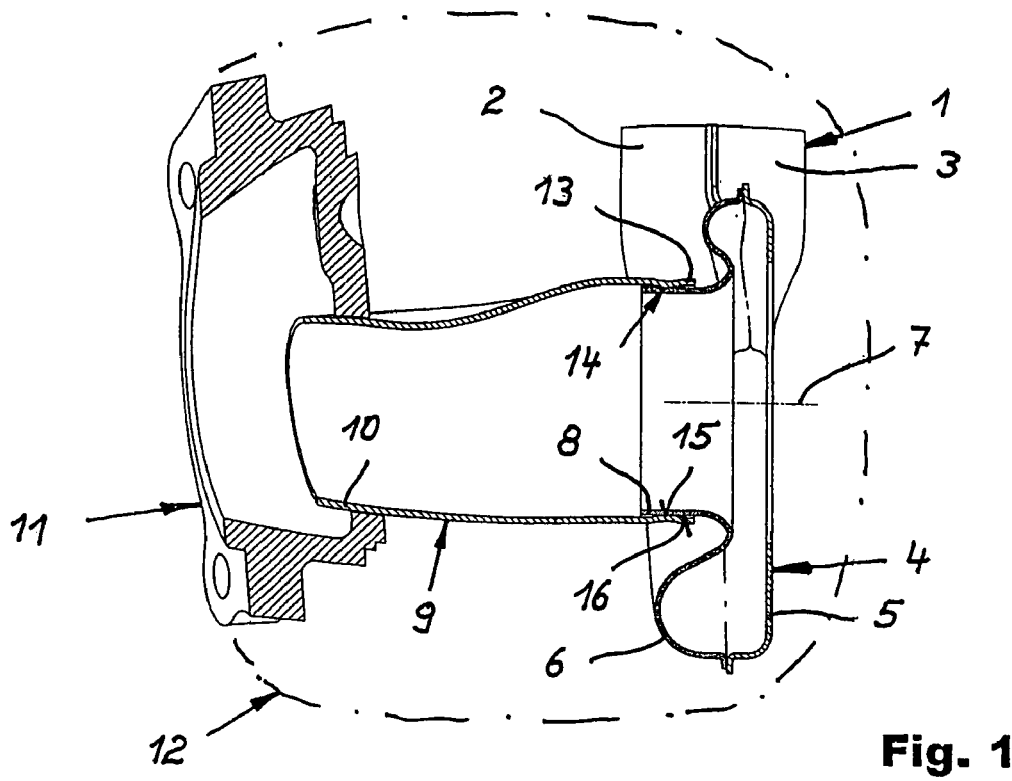
FIG. 1 is a sectional view of one embodiment of a casing arrangement according to the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a sectional view of one embodiment of a casing arrangement according to the present invention. The casing arrangement includes a funnel-shaped intake duct, generally designated by reference numeral 1 and composed of two half-shells 2, 3 of sheet metal. Although not shown in detail, the intake duct 1 is connected to the exhaust pipes of an internal combustion engine. The intake duct 1 terminates in a spirally curved rotor casing, generally designated by reference numeral 4 and composed of two half-shells 5, 6 of sheet metal joined together at their outer periphery. The rotor casing 4 houses a rotor which is shown only by way of its axis 7.

The half-shell 6 of the rotor casing 4 includes an axially extending tubular outlet member 8 which is slidingly coupled to an exhaust flow passage 9 that can be shaped of tubular configuration and made of steel sheet. The exhaust flow passage 9 has one end 10 which is distal to the rotor casing 4 and projects into an exhaust flange 11 which is made of casting material and joined to the exhaust flow passage 9.

The exhaust flange 11, the exhaust flow passage 9, the rotor casing 4 and the intake duct 1 are surrounded by an outer housing 12, which is merely indicated by a dash-dot line. The outer housing 12 is gastight with respect to the surroundings and can be constructed in any suitable shape or size to suit the application at hand.

The sliding coupling between the rotor casing 4 and the exhaust flow passage 9 is realized by providing the exhaust flow passage 9 with a cylindrical end 13 in overlapping relationship to the tubular outlet member 8. The end 13 is hereby formed with a radially inwardly embossed annular bead 14 to define a convex surface 15 which is in frictional contact with an outer surface 16 of the outlet member 8.

Figure 2:
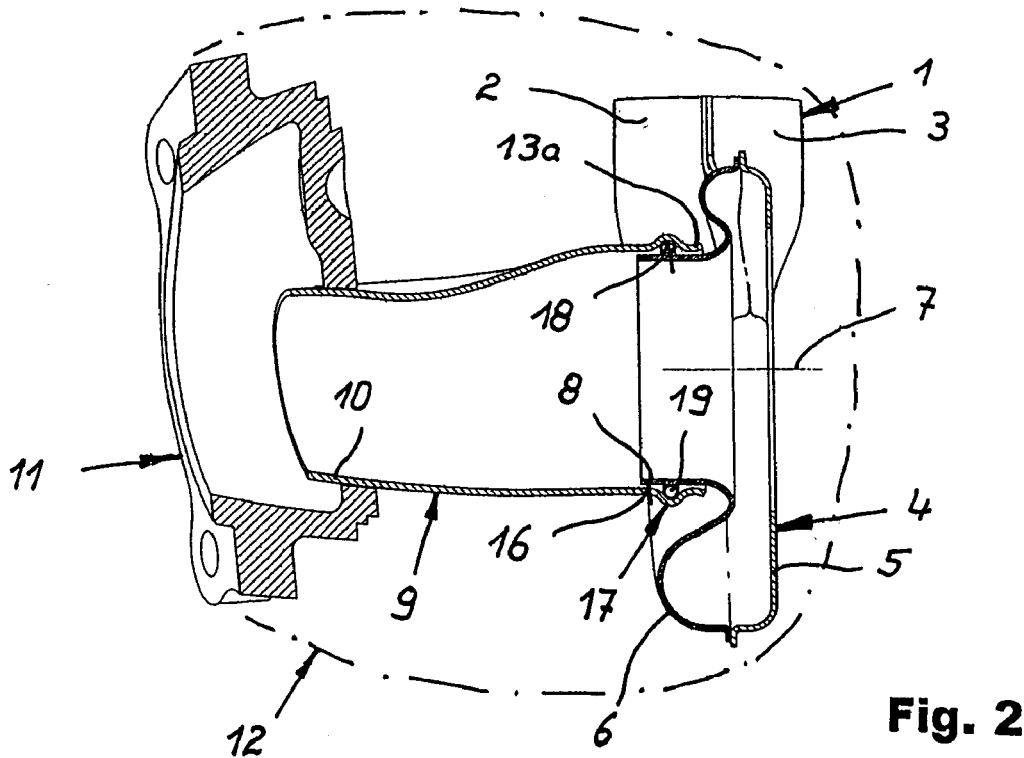
FIG. 2 is a sectional view of another embodiment of a casing arrangement according to the present invention.

Referring now to FIG. 2, there is shown a sectional view of another embodiment of a casing arrangement according to the present invention. Parts corresponding with those in FIG. 1 are denoted by identical reference numerals and not explained again. The description below will center on the differences between the embodiments. In this embodiment, the flow passage 9 overlaps the outlet member 8 with a cylindrical end 13a which is formed with a radially outwardly embossed annular bead 17, thereby defining an inner annular groove 18 for receiving a sealing element 19, such as a sealing ring. The sealing element 19 bears upon the outer surface 16 of the outlet member 8. Thus, a relative shift between the flow passage 9 and the rotor casing 4 as a result of heat development is easily assured.

Figure 3:
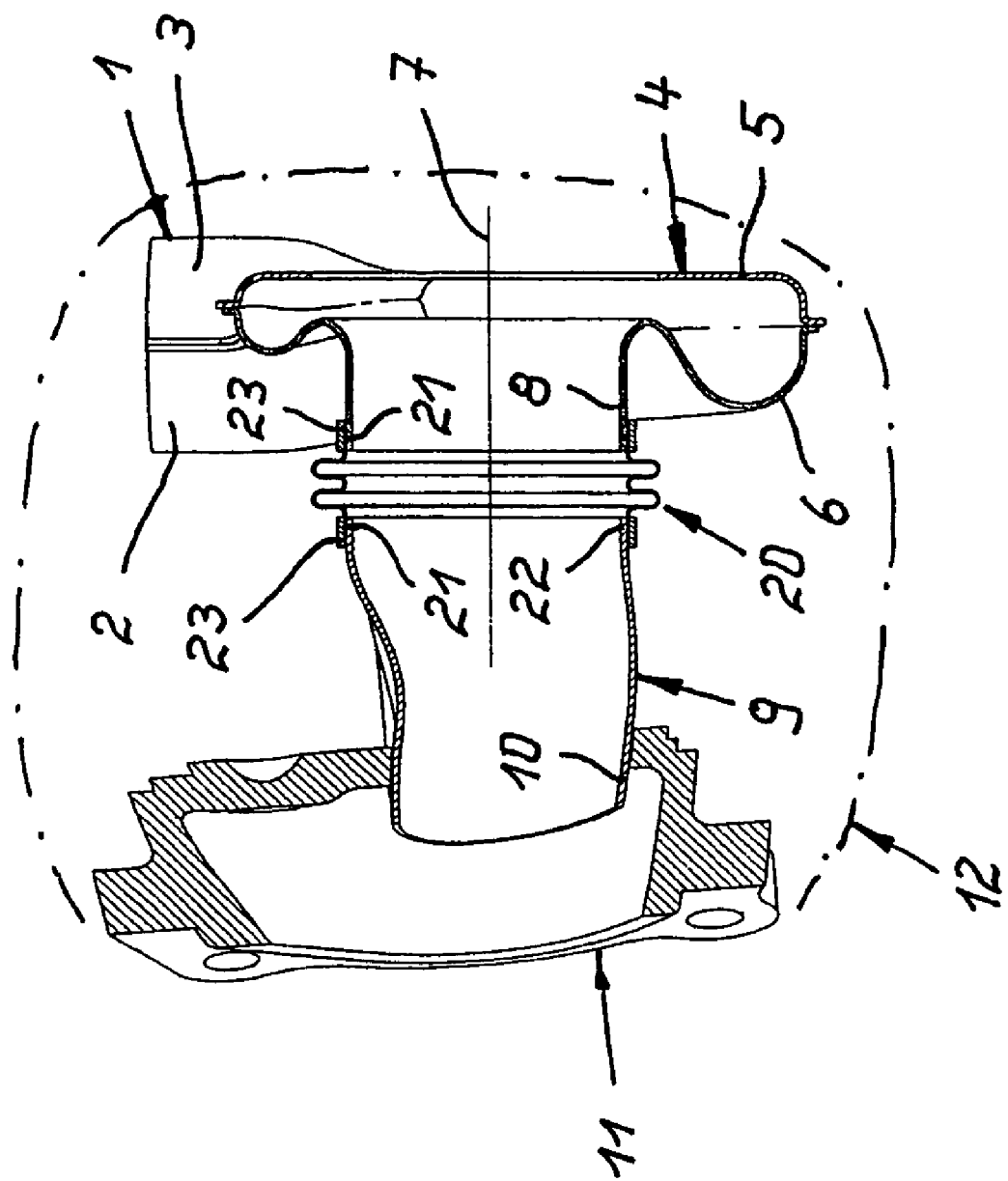
FIG. 3 is a sectional view of yet another embodiment of a casing arrangement according to the present invention.

FIG. 3 shows yet another embodiment of a casing arrangement according to the present invention. Parts corresponding with those in FIG. 1 are denoted by identical reference numerals and not explained again. The description below will center on the differences between the embodiments. In this embodiment, provision is made for a bellows 20 for snugly coupling the flow passage 9 with the outlet member 8 of the rotor casing 4. The bellows 20 has opposite tubular ends 21 placed in embracing relationship with the outlet member 8 and the neighboring end 22 of the exhaust flow passage 9. Fastening rings or clips 23 are pushed over the bellows ends 21 to secure the bellows 20 to the outlet member 8 and the exhaust flow passage 9.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein.

What is claimed is:

1. A casing arrangement for a turbocharger of an internal combustion engine, comprising:

a rotor casing having an intake duct and made of two half-shells of sheet metal joined together at their outer periphery, said rotor casing including an axially extending tubular outlet member which is made in one piece with one of the half-shells;

an exhaust flow passage having one end portion joined to an exhaust flange and another cylindrical end portion which has a radially inwardly embossed annular bead in frictional contact with the outlet member and which overlaps the outlet member of the rotor casing such as to allow a relative movement between the exhaust flow passage and the rotor casing during operation of the turbocharger; and an outer housing in surrounding relationship to the exhaust flow passage, rotor casing and intake duct.

2. The casing arrangement of claim 1, wherein the end portion of the exhaust flow passage has a radially outwardly embossed annular bead for defining an inner annular groove, and further comprising a sealing element for placement in the annular groove.

3. The casing arrangement of claim 2, wherein the sealing element is a sealing ring which rests against an outer surface of the outlet member of the rotor casing.

* * * * *